United States Patent [19]

Höhne

[11] 4,131,570
[45] Dec. 26, 1978

[54] METHOD FOR THE MANUFACTURE OF A SILVER CATALYST FOR ELECTROCHEMICAL CELLS AND THE CATALYST PREPARED BY THE METHOD

[75] Inventor: Karl Höhne, Erlangen, Germany

[73] Assignee: Siemens Aktiengesellschaft, Munich, Germany

[21] Appl. No.: 880,341

[22] Filed: Feb. 23, 1978

[30] Foreign Application Priority Data
Mar. 29, 1977 [DE] Fed. Rep. of Germany ....... 2713855

[51] Int. Cl.² .................... B01J 23/68; B01J 23/80; B01S 23/84
[52] U.S. Cl. .................... 252/473; 252/425.3; 429/44
[58] Field of Search .................... 252/473, 475, 425.3; 429/44

[56] References Cited

U.S. PATENT DOCUMENTS

| 3,318,736 | 5/1967 | Barber | 429/44 |
| 3,900,342 | 8/1975 | Höhne et al. | 252/476 |

Primary Examiner—W. J. Shine
Attorney, Agent, or Firm—Kenyon & Kenyon, Reilly, Carr & Chapin

[57] ABSTRACT

The invention relates to a method for manufacturing a silver catalyst for electrochemical cells, wherein metallic silver is precipitated on a metal hydroxide gel by reduction of a silver salt. According to the invention, a silver-mercury alloy is precipitated on the metal hydroxide gel by simultaneous reduction of the silver salt and a mercury salt, the mercury content of the catalyst being between about 10 and 17% by weight, referred to the total weight, and the metal hydroxide content of the catalyst is preferably between about 1.5 and 2.0% by weight, referred to the silver. Catalysts prepared according to the method of this invention are particularly useful as catalysts for air electrodes of fuel cells having excellent long-term behavior.

6 Claims, 2 Drawing Figures

METHOD FOR THE MANUFACTURE OF A SILVER CATALYST FOR ELECTROCHEMICAL CELLS AND THE CATALYST PREPARED BY THE METHOD

BACKGROUND OF THE INVENTION

The invention relates to a method for the manufacture of a silver catalyst for electrochemical cells, particularly fuel cells, wherein metallic silver is precipitated on a metal hydroxide gel by reduction of a silver salt, and 0.5 to 5% by weight of hydroxides, referred to the silver, of the metals bismuth, nickel and titanium are utilized, as well as to a silver catalyst manufactured by this method.

It is known to use silver as a catalyst for the oxygen reduction in positive electrodes of electrochemical cells such as fuel cells. For example, in fuel cells with alkaline electrolytes, Raney silver has proven useful. The preparation of Raney silver presents difficulties, however, particularly in the milling of the melt regulus of silver and aluminum due to the ductility of the silver-aluminum alloy.

The difficulties arising in the preparation of Raney silver may be avoided by a method, known from Canadian Patent 977,735, for the manufacture of a silver catalyst for electrodes of electrochemical cells. In this method, metallic silver is precipitated on a gel-like metal hydroxide by reduction of a silver salt. Subsequently, the metal hydroxide is dissolved. The metal hydroxide may be aluminum hydroxide, cobalt hydroxide, cadmium hydroxide or nickel hydroxide and the gel-like metal hydroxide is first precipitated by the addition of a base to a metal salt solution. A reducing agent is then added to the suspension obtained and to this mixture is added a solution of the silver salt. The silver salt is reduced to metallic silver and the silver is precipitated on the metal hydroxide gel. Subsequently, the metal hydroxide is dissolved, at least partially, from the silver-metal hydroxide mixture.

To some extent, however, this method remains somewhat expensive, since several process steps are necessary. In addition, the major portion of the original carrier material, i.e., the metal hydroxide gel, is removed, which is economically undesirable. These disadvantages may be circumvented in a method known from U.S. Patent 3,900,342, by utilizing in the preparation of a silver catalyst (through precipitation of metallic silver on a metal hydroxide gel in the course of the reduction of a silver salt), 0.5 to 5% by weight of commingled hydroxides, referred to the silver, of at least two of the metals titanium, iron, cobalt, nickel and bismuth. In addition to overcoming the above-noted disadvantages, the catalyst obtained in this manner exhibits increased activity.

In the silver catalyst prepared in accordance with this known method, one of the metal hydroxides contained in the catalyst is preferably bismuth. Of other metal hydroxides, the following combinations, among others, may also be present: cobalt and nickel hydroxide, nickel and titanium hydroxide, or iron, nickel and titanium hydroxide.

Among these silver catalysts, a catalyst with bismuth, nickel and titanium hydroxide, which is referred to hereinafter as an $Ag_{BiNiTi}$ catalyst, has particularly been found to be highly suitable for the cathodic reaction of oxygen, specifically with respect to the activity and long-term behavior. While this catalyst is also suitable for the reaction of air oxygen, the long-term behavior is not quite satisfactory. This is disadvantageous since $H_2/O_2$ fuel cells become energy generators of economic interest only if air instead of oxygen can be used as the operating gas, i.e., as the oxidant.

SUMMARY OF THE INVENTION

It is therefore an object of the invention to improve the method for the manufacture of silver catalysts of the type mentioned at the outset (i.e., where metallic silver is precipitated by the reduction of a silver salt on a metal hydroxide gel) in such a manner that catalysts are obtained which exhibit good long-term behavior in air operation, i.e., in the electrochemical reaction of air oxygen.

According to the invention, this is achieved by the provision that by simultaneous reduction of the silver salt and a mercury salt, a silver-mercury alloy is precipitated on the metal hydroxide gel, the mercury content of the catalyst being between about 10 and 17% by weight, referred to the total weight.

As will be shown in detail in the following, the silver catalyst made according to the invention is found to be considerably superior to the $Ag_{BiNiTi}$ catalyst with respect to the long-term behavior in continuous operation with air, since the activity loss is substantially smaller in this catalyst than in the known catalyst. Beginning with approximately the same initial activity, the activity loss of the catalyst according to the invention is only about 50% of that of the $Ag_{BiNiTi}$ catalyst. This fact could not be foreseen and must be considered as highly suprising since, contrary thereto, known silver-mercury catalysts (e.g., U.S. Patent 3,318,736) exhibit, with air operation, not only less initial activity, but also a considerably increased activity loss.

The reduction of the silver and the mercury salt can advantageously be accomplished in the method according to the invention with an aqueous formaldehyde solution, since the best results are obtained with formaldehyde as the reducing agent. However, other reducing agents, such as hydrazine and hydroxylamine, may also be used for the reduction. Silver and mercury nitrates are preferably employed in the method according to the invention, however, other soluble silver and mercury salts can also be used.

The method according to the invention can be carried out, for example, in such a manner that an aqueous or weakly acid solution of the silver salt, the mercury salt and a reducing agent, preferably formaldehyde, is added dropwise to a gel-like suspension of the metal hydroxides in an alkaline solution, while cooling and stirring. The mixture of matter, i.e., the alkaline suspension, is advantageously mixed vigorously during the reduction, since it has been found that catalysts with a particularly high activity are obtained in this manner. During the reduction, a silver-mercury alloy, i.e., silver amalgam, precipitates on the suspended metal hydroxides. At the end of the reduction, the excess alkaline solution is separated from the reaction mixture and the precipitate is processed into the finished catalyst by washing and drying.

The mercury content of the silver catalyst produced by the method according to the invention is between about 10 and 17% by weight, referred to the total weight of the catalyst, and preferably between about 10 and 12%. Silver catalysts having a mercury content in this latter range show the highest activity.

The silver catalyst according to the invention preferably has a metal hydroxide content of about 1.5 to 2.0% by weight, referred to the silver. The metals present in the metal hydroxide gel are preferably contained in the catalyst according to the invention in about the following proportions (referred to silver): 0.7 to 0.8% by weight bismuth, 0.4 to 0.5% by weight nickel and 0.1% by weight titanium.

The catalysts prepared by the method according to the invention are preferably utilized in electrodes for fuel cells and fuel cell batteries. In addition, however, these catalysts can also be used in metal/air cells. The catalytic material can be processed into electrodes in a manner which is known per se; the catalytic material can be present in the electrodes, for example, in the form of powder beds. Advantageously, however, a sedimentation process is used for manufacturing the electrodes. For this purpose, an aqueous suspension which contains the catalytic material and asbestos fiber is preferably allowed to settle on a substrate. Optionally, a binder for catalytic material and/or a hydrophobic agent can be added to the suspension. With this procedure, silver electrodes are obtained which are easy to handle and are very stable, and also have high catalytic activity even if the catalyst/coating is kept very low, for example, about 50 mg/cm$^2$.

DETAILED DESCRIPTION OF THE INVENTION

Figure 1:
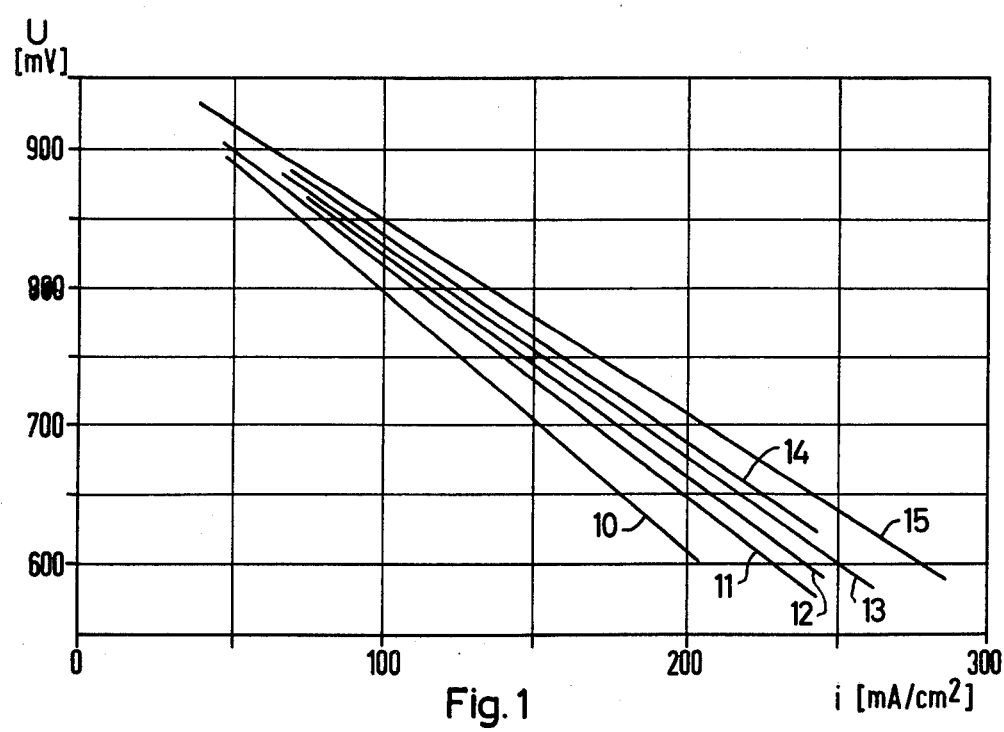
FIGS. 1 and 2 are graphical representations of the results obtained on investigations, respectively, of catalysts according to the invention and electrodes made therefrom.

The invention will now be explained in further detail, referring to several embodiment examples and figures.

2.8 liters of KOH (12 molar) are reacted with a solution of 10 g Ni(NO$_3$)$_2$ . 6 H$_2$O in 50 ml water and 8.6 g of a 15% aqueous solution of TiCl$_3$. In the process, the metal hydroxides of nickel and titanium are precipitated in gel form. The suspension obtained is cooled with ice to about 0 to 10° C. and in the course of about 5 hours, a mixture is added dropwise of 680 g AgNO$_3$ in 3 liters water, 4.8 g basic bismuth (III) nitrate (BiONO$_3$ . H$_2$O) in 40 ml HNO$_3$, 83.3 g Hg(NO$_3$)$_2$ in 600 ml water and 800 ml of an aqueous 35% formaldehyde solution (formalin). While this mixture is being added drop by drop, the reaction mixture is mixed vigorously. The reaction temperature should not exceed 15° C. After the reduction is completed, the precipitate formed is allowed to settle and the excess KOH is decanted. The precipitate is washed with water until the wash water reacts neutral. Then the remaining water is drawn off, the silver catalyst obtained is washed with methanol, which is then also drawn off, followed by drying for about 2 hours at about 120° C. The mercury content of the catalyst obtained thereby is between about 10.5 and 11% by weight.

In a similar manner, catalysts having a mercury content of about 6, 9, 16, 20 and 33% by weight are prepared.

The solution of the basic bismuth (III) nitrate in concentrated nitric acid can, as is done with the solutions of the other metal salts, be added to the potassium hydroxide (prior to adding a silver nitrate-mercury nitrate-formaldehyde solution), in which process the metal hydroxide is likewise precipitated. In that case it is advisable to acidify the aqueous silver nitrate-mercury nitrate-formaldehyde solution somewhat, for example, by adding 20 ml of concentrated HNO$_3$, in order to prevent premature reduction of the metal nitrates.

The silver-mercury catalyst prepared in the manner described above, which contains bismuth, nickel and titanium, is made into an electrode in the following manner. 0.1 g asbestos fibers are digested in 500 ml water by means of a turbo stirrer. The aqueous asbestos fiber suspension obtained is reacted with 10 g of a 60% aqueous polytetrafluoroethylene latex. To this suspension of asbestos fibers and binding or hydrophobic agent, 20 g of the silver catalyst are added while stirring. The homogeneous suspension so obtained is poured into a sheet former with an inside diameter of about 21 cm, provided with filter paper. The suspension is briefly whirled up by means of a vibrator and is then allowed to settle. Thereupon, the excess water is drawn off and the filter paper together with the filter cake is dried in a water jet vacuum for about 2 hours at 110 to 120° C. After drying, the filter paper is pulled off and a foil of good mechanical stability is obtained in this manner, from which electrodes of the desired size can be cut. These electrodes have an extremely uniform distribution of the catalytic material and a coating of about 58 mg/cm$^2$. The catalyst content of the electrodes is about 76.6% by weight, the polytetrafluoroethylene content is about 23% by weight and the asbestos content about 0.4% by weight.

The silver catalysts according to the invention were tested in fuel cells with supported electrodes and free electrolyte; as is well known, larger IR shares occur here than in matrix cells. Negative electrodes of sedimented Raney nickel served for the hydrogen reduction. The investigations were carried out under the following test conditions: Hydrogen pressure, 1.8 bar; operating pressure of the air, 1.15 bar; operating temperature, 80 to 83° C.; and 5 to 6 molar KOH served as the electrolytic liquid. The air throughput was about two to three times stoichiometric and the carbon dioxide contained in the air was removed by means of soda lime.

Figure 2:
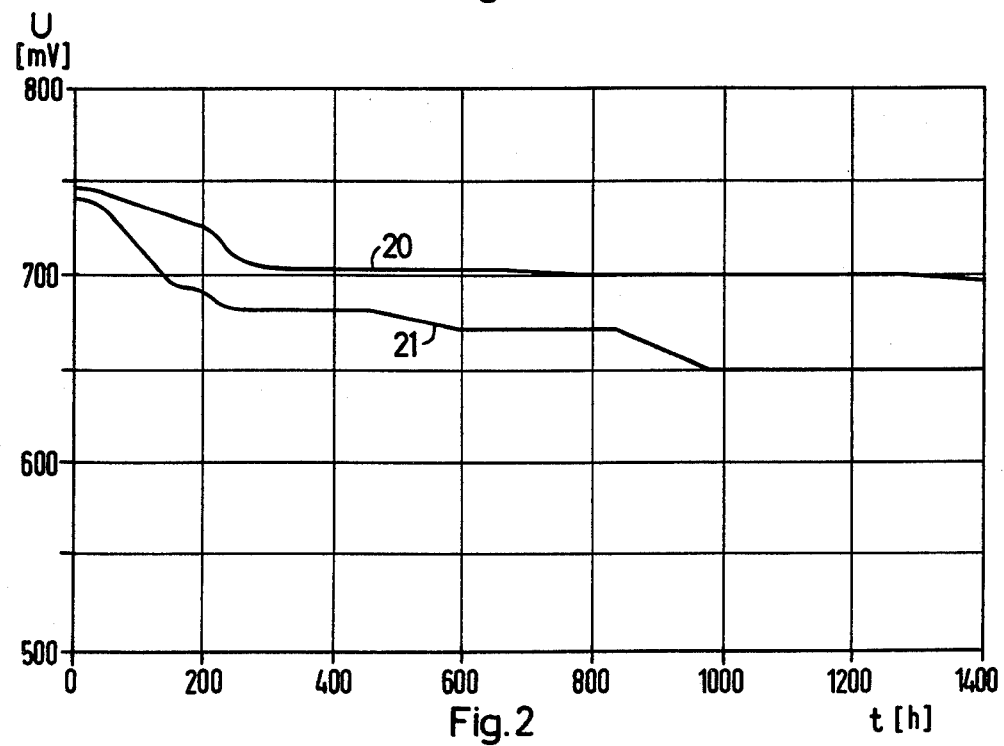

The results obtained in the investigations on the silver catalysts according to the invention, or the electrodes made therefrom, are shown in FIGS. 1 and 2. In FIG. 1 current density-vs-voltage characteristics are given, the current density (i) in mA/cm$^2$ being plotted along the abscissa and the voltage (U) in mV along the ordinate. The numerical characteristics 10 to 15 apply to the silver catalysts having a mercury content of 33, 6, 9, 20, 16 and 11% by weight, respectively. The shape of the characteristic for a mercury-free catalyst Ag$_{BiNiTi}$ prepared in a similar manner, is essentially like that of the silver catalyst according to the invention with about 11% by weight mercury (Curve 15), i.e., the addition of mercury causes no improvement as far as the initial activity is concerned.

FIG. 2 shows the behavior of two electrodes in continuous operation. The time (t) is plotted here in hours along the abscissa and the voltage (U) in mV along the ordinate. Curve 20 gives the results which are obtained with an electrode containing the silver catalyst according to the invention (mercury content, about 11% by weight), and Curve 21 that of an electrode with the known Ag$_{BiNiTi}$ catalyst; both curves apply for a current density of about 175 mA/cm$^2$. It can be seen from FIG. 2 that the addition of mercury has a stabilizing effect on the long-term behavior. For, while the cell voltage of a fuel cell with the Ag$_{BiNiTi}$ electrode (Curve 21) drops from 742 mV to about 650 mV within 1000 operating hours, i.e., by about 100 mV, the voltage drop of the electrode (Curve 20) containing the catalyst according to the invention is only about 50 mV, from 746 to about 700 mV. Since with a loading of 175 mA/cm$^2$ at the negative electrodes of Raney nickel, hardly any aging takes place, the voltage drop must be caused essentially by the positive electrodes, i.e., the air electrodes. This means that, for air operation, the aging rate of the electrodes containing the catalyst according to the invention is only half of that of electrodes with the known Ag$_{BiNiTi}$ catalyst.

The catalyst made in accordance with this invention comprises an unleached composite of a metallic silver-mercury alloy disposed on commingled hydroxides of bismuth, nickel and titanium.

What is claimed is:

1. In a method for preparing a silver catalyst suitable for use as electrode material for electrochemical cells wherein a silver salt is reduced to precipitate metallic silver on a commingled mixture of hydroxides of bismuth, nickel and titanium, the content of said hydroxides being from about 0.5 to 5% by weight based upon the amount of silver present in the finished catalyst, the improvement comprising simultaneously reducing a mercury salt along with the silver salt to precipitate a metallic silver-mercury alloy on said mixture of hydroxides, the mercury content of the finished catalyst being between about 10 to about 17% by weight based upon the total weight of the catalyst.

2. A method according to claim 1 wherein said silver and mercury salts are added to an aqueous solution of formaldehyde from which reduction to said metallic silver-mercury alloy takes place.

3. A silver catalyst suitable for use as electrode material for electrochemical cells comprising an unleached composite of predominantly a metallic silver-mercury alloy disposed on commingled hydroxides of bismuth, titanium and nickel, wherein the content of said hydroxides is in the range of from about 0.5 to 5% by weight based on the amount of silver present in the finished catalyst, and wherein the mercury content of said catalyst is in the range of from about 10 to about 17% by weight based on the total weight of said catalyst.

4. The catalyst according to claim 3 wherein said mercury content is in the range of from about 10 to about 12% by weight based on the total weight of said catalyst.

5. The catalyst according to claim 4 wherein the content of said hydroxides is in the range of from about 1.5 to 2.0% by weight based on the amount of silver in said catayst.

6. The catalyst according to claim 5 wherein the bismuth content of said catalyst is from about 0.7 to about 0.8%, the nickel content is from about 0.4 to about 0.5%, and the titanium content is about 0.1%, all percents by weight based upon the amount of silver in said catalyst.

* * * * *